(12) United States Patent
Sood et al.

(10) Patent No.: US 12,068,928 B2
(45) Date of Patent: Aug. 20, 2024

(54) METHODS AND APPARATUS TO SCHEDULE WORKLOADS BASED ON SECURE EDGE TO DEVICE TELEMETRY

(71) Applicant: Intel Corporation, Santa Clara, CA (US)

(72) Inventors: Kapil Sood, Portland, OR (US); Timothy Verrall, Pleasant Hill, CA (US); Ned M. Smith, Beaverton, OR (US); Tarun Viswanathan, El Dorado Hills, CA (US); Kshitij Doshi, Tempe, AZ (US); Francesc Guim Bernat, Barcelona (ES); John J. Browne, Limerick (IE); Katalin Bartfai-Walcott, El Dorado Hills, CA (US); Maryam Tahhan, Limerick (IE); Eoin Walsh, Limerick (IE); Damien Power, Clare (IE)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 17/033,557

(22) Filed: Sep. 25, 2020

(65) Prior Publication Data

US 2021/0021484 A1  Jan. 21, 2021

(51) Int. Cl.
*H04L 12/00* (2006.01)
*H04L 9/40* (2022.01)
*H04L 41/5006* (2022.01)
*H04L 41/5019* (2022.01)
*H04L 43/0888* (2022.01)

(52) U.S. Cl.
CPC ...... *H04L 41/5006* (2013.01); *H04L 41/5019* (2013.01); *H04L 43/0888* (2013.01); *H04L 63/123* (2013.01); *H04L 63/126* (2013.01)

(58) Field of Classification Search
CPC . H04L 43/20; H04L 43/0876; H04L 43/0852; H04L 41/40; H04L 41/506; H04L 41/5019; H04L 43/0888; H04L 63/123; H04L 63/126
USPC .................................................. 709/222–224
See application file for complete search history.

(56) References Cited

U.S. PATENT DOCUMENTS

| 11,115,334 | B1* | 9/2021 | Iorga ....................... H04L 47/32 |
| 2020/0136920 | A1* | 4/2020 | Doshi ..................... H04L 67/10 |
| 2020/0142735 | A1* | 5/2020 | Maciocco ............. G06F 21/602 |
| 2020/0167205 | A1* | 5/2020 | Guim Bernat .......... G06F 1/206 |
| 2021/0021484 | A1* | 1/2021 | Sood ................... H04W 12/122 |

(Continued)

OTHER PUBLICATIONS

European Patent Office, "Communication pursuant to Article 94(3)" issued in connection with European Application No. 21189253.4, dated Nov. 16, 2023, 7 pages.

(Continued)

*Primary Examiner* — Frantz Coby
(74) *Attorney, Agent, or Firm* — Hanley, Flight & Zimmerman, LLC

(57) ABSTRACT

Methods, apparatus, systems and articles of manufacture are disclosed to schedule workloads based on secure edge to device telemetry by calculating a difference between a first telemetric data received from a first hardware device and an operating parameter and computing an adjustment for a second hardware device based on the difference between the first telemetric data and the operating parameter.

25 Claims, 10 Drawing Sheets

(56) References Cited

U.S. PATENT DOCUMENTS

2021/0135967 A1* 5/2021 Iorga .................. H04L 41/0886
2021/0194772 A1* 6/2021 Cencini ................ G06F 1/189
2021/0306246 A1* 9/2021 Jacob Da Silva .. H04L 41/0816
2021/0409448 A1* 12/2021 Byrne ................ H04L 63/0227

OTHER PUBLICATIONS

European Patent Office, "Extended European Search Report," issued in connection with European Application No. 21189253.4, dated Jan. 19, 2022, 8 pages.

* cited by examiner

METHODS AND APPARATUS TO SCHEDULE WORKLOADS BASED ON SECURE EDGE TO DEVICE TELEMETRY

FIELD OF THE DISCLOSURE

This disclosure relates generally to telemetry-based workload scheduling, and, more particularly, to methods and apparatuses to schedule workloads based on secure edge to device telemetry.

BACKGROUND

Edge computing is a decentralized computing environment in which events, requests, and data streams are processed in a manner leading to low and deterministic latency responses. Edge computing, communication, and storage resources are aggregated flexibly and dynamically in hierarchical or peer-to-peer relationships. Thus, edge computing networks have the ability to mobilize operations with critical response-time and/or bandwidth needs to local networks, e.g., networks at the "far edge," while mobilizing operations with complex, computation intensive operations to deeper and richer resource networks in traditional clouds, e.g., networks at the "near edge."

Hardware devices near the edge of a network (e.g., base stations of a cellular network) may be responsible for executing multiple workloads associated with events, requests, or data streams from client compute nodes. A workload may be mobile, movable, migratable, and/or distributable and may be transferred within a hardware device or between hardware devices. The transfer of a workload within a hardware device and/or between hardware devices in a network is referred to as workflow.

Edge nodes associated with these hardware devices may include an amount of processing and storage capabilities and, as such, some processing and/or storage of data for the client compute nodes may be performed at the edge node. Further, many different services, often with different security requirements, resource entitlements, and service level agreements, may need to utilize the limited resources of the edge nodes at the same time.

Figure 1:
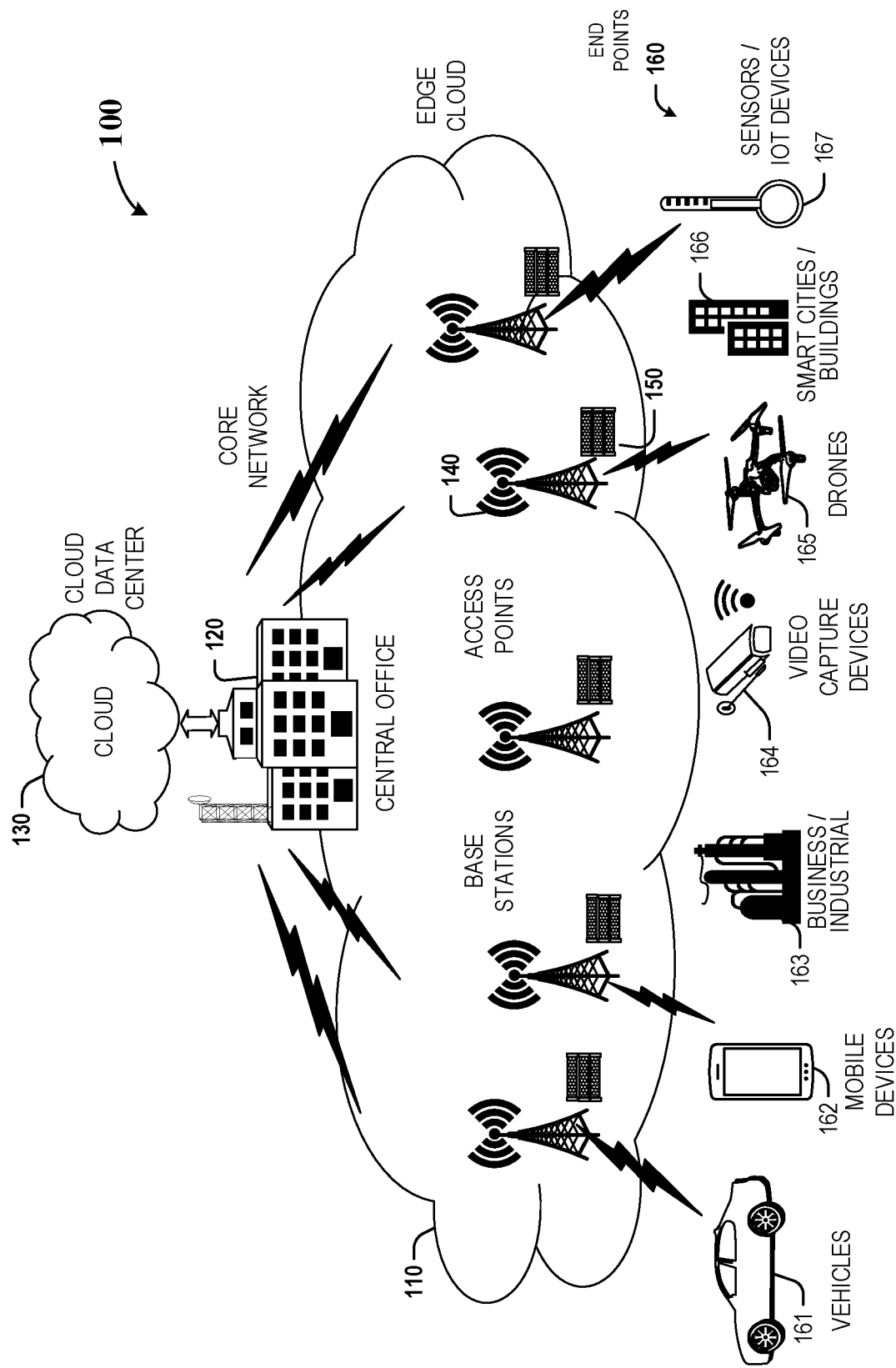
FIG. 1 illustrates an overview of an edge cloud configuration for edge computing.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

In meeting the low latency and high bandwidth demands and security constraints, orchestration in edge computing networks relies on timely information about the utilization of resources and the efficiency with which those resources can meet the demands placed on them. Such information—generally referred to as telemetry, may have many dimensions. Each hardware component is a source of information that is germane to decisions regarding which activities should be scheduled at which resource and what the expected time to completion is given current telemetry and telemetry collected in recent past.

Edge computing infrastructures may include several operational layers. Hardware devices near the edge of an edge network (e.g., base stations of a cellular network) may execute workloads associated with task that a user/subscriber wants to accomplish. A workload may be mobile, movable, migratable, and/or distributable and may be transferred within a hardware device or between hardware devices. The transfer of a workload within a hardware device and/or between hardware devices in a network is referred to as workflow.

As an example, a mobile user in a moving vehicle may be streaming a television show at a resolution of 1080p using a streaming platform operated by a service provider. The workload associated with streaming the television show at 1080p is transferred from base station to base station in the edge network as the vehicle moves along. For example, a first base station may execute the workload until the vehicle exits the radius of attenuation of that first base station and then the first base station may transfer the workload to a second base station for further execution.

In another example, a drone deployed in a national emergency may need to determine whether a first base station in a network is functional and has capacity to execute a workload by accessing telemetric data associated with the first base station.

In yet another example, a piece of manufacturing equipment operating in an edge computing network may include multiple hardware devices that execute a workload in accordance with one or more operating parameters. Telemetry data from each hardware device may be collected and analyzed to determine whether a hardware device is executing the workload within the operating parameters. If the hardware device is executing the workload outside of the operating parameters, the workload of one or more downstream hardware devices may be adjusted to compensate for the deficiency.

Telemetry associated with a hardware device may be leveraged to improve the scheduling and efficiency of a workflow as workloads are transferred within a hardware device and between hardware devices in an edge network. Telemetric data may include a latency metric, a utilization metric, a memory bandwidth metric, a throughput metric, a power expenditure metric, and/or any other metric related to the capacity and/or performance of an edge network device. Collecting and analyzing telemetric data to identify and remediate problems or stressors and prioritize the right resources in the proper proportions may be difficult given the limited resources of edge nodes.

One or more hardware devices within a network may be bound to operate in accordance with operating parameters set forth in a service level agreement (SLA) between a service provider and a network provider. Such service level agreements may ensure that network providers are meeting Quality of Service (QoS) standards set forth by the service provider. SLA's may also provide context for security decisions by identifying stakeholders and contracted support for the hardware devices. Telemetric data from a first hardware device may be used to determine whether the first hardware device is operating in accordance with a service level agreement by comparing the telemetric data received from the first hardware device to one or more operating parameters set forth by the service level agreement.

The operating parameters set forth in an SLA may include a latency parameter, a utilization parameter, a memory bandwidth parameter, a throughput parameter, a power expenditure parameter, and/or any other parameter related to the capacity, utilization, efficiency, and/or performance of the base station. For example, a streaming service provider may require one or more base stations within an edge network to operate within a given latency range so that mobile users do not experience disruptions in service.

The example systems, methods, and apparatuses disclosed herein collect and analyze telemetric data from a first hardware device, identify and remediate problems, stressors, and/or performance deficiencies of the first hardware device based on the telemetric data, adjust the workload of one or more downstream hardware devices to remediate the problem, stressor, and/or performance deficiency, and/or calculating a proposed new operating parameter for the first hardware device. The example systems, methods, and apparatuses disclosed herein may be workflow aware by receiving and analyzing telemetry data from downstream hardware devices and/or adjusting downstream hardware devices based on telemetric data from the downstream hardware devices.

In some examples, the systems, methods, and apparatuses disclosed herein include receiving first telemetric data from a first hardware device, calculating a difference between the first telemetric data and an operating parameter, and computing an adjustment for at least a second hardware device based on the calculated difference. In some examples, the examples systems, methods, and apparatuses disclosed herein include determining, based on a comparison between the first telemetric data and the operating parameter, whether the first hardware device has capacity to execute a workload in accordance with the operating parameter and calculating a proposed new operating parameter responsive to a determination that the first hardware device does not have capacity to execute the workload in accordance with the operating parameter. In some examples, the examples systems, methods, and apparatuses disclosed herein include verifying the authenticity of first telemetric data received from a first hardware device.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources. The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
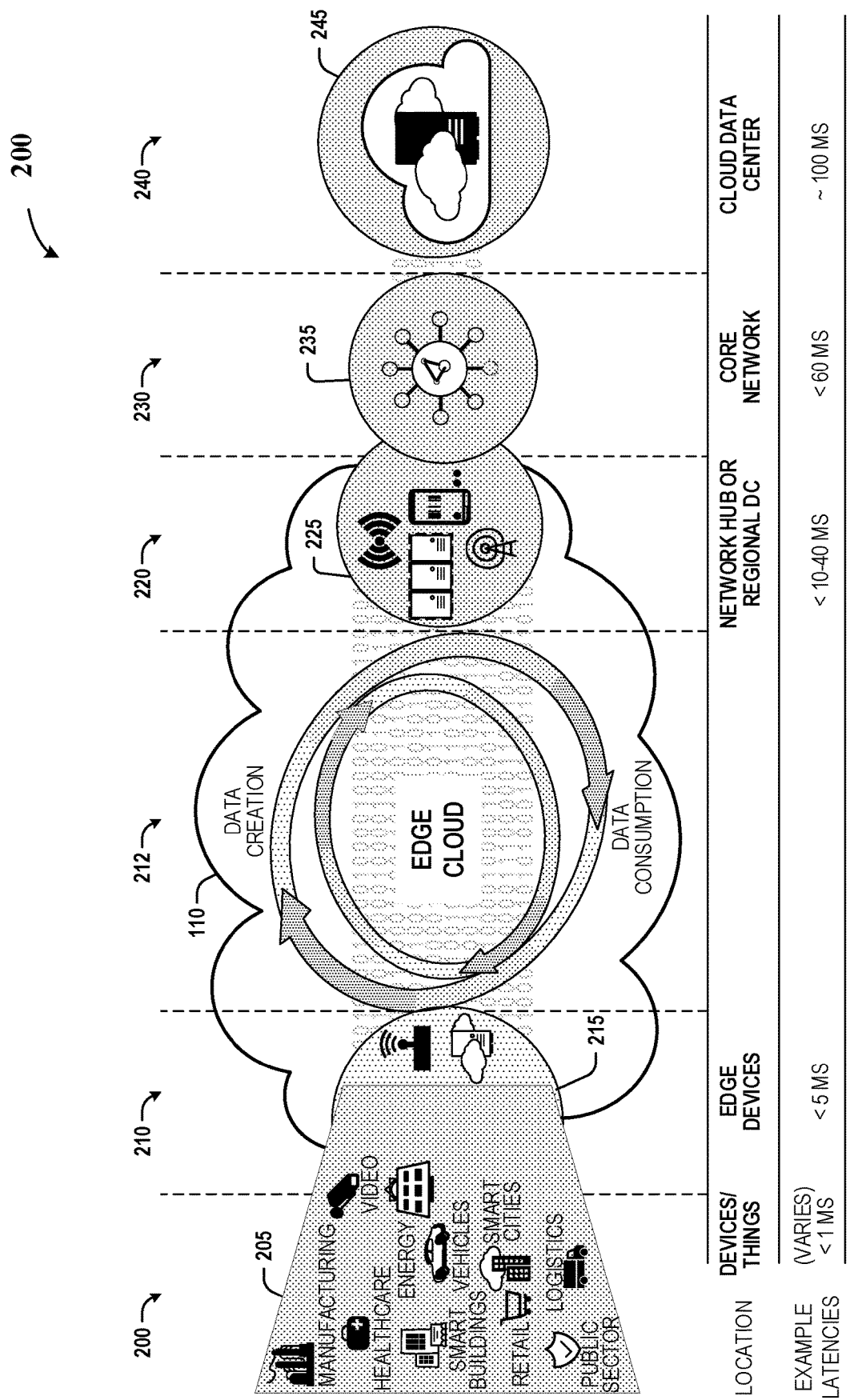
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers, or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network layer 230 and cloud data center layer 240, each with increasing latency (e.g., between 50-60 ms at the core network layer 230, to 100 or more ms at the cloud data center layer. As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case, or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more server and/or one or more multi-tenant server. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
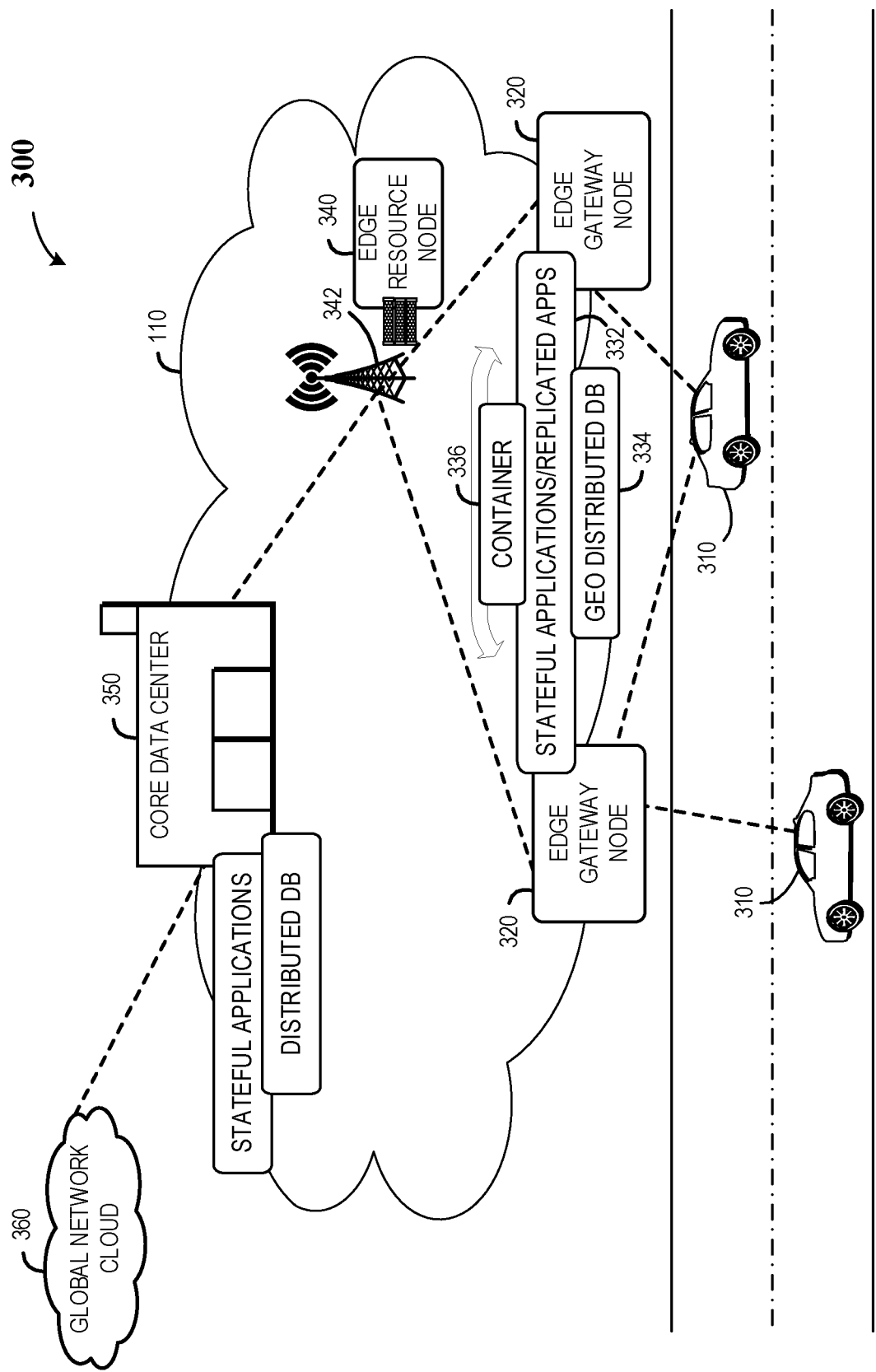
FIG. 3 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 3 shows an example simplified vehicle compute and communication use case involving mobile access to applications in an example edge computing system 300 that implements an edge cloud such as the edge cloud 110 of FIG. 1. In this use case, respective client compute nodes 310 may be embodied as in-vehicle compute systems (e.g., in-vehicle navigation and/or infotainment systems) located in corresponding vehicles which communicate with the example edge gateway nodes 320 during traversal of a roadway. For instance, the edge gateway nodes 320 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 310 and a particular one of the edge gateway nodes 320 may propagate so as to maintain a consistent connection and context for the example client compute node 310. Likewise, mobile edge nodes may aggregate at the high priority services or according to the throughput or latency resolution requirements for the underlying service(s) (e.g., in the case of drones). The respective edge gateway nodes 320 include an amount of processing and storage capabilities and, as such, some processing and/or storage of data for the client compute nodes 310 may be performed on one or more of the edge gateway nodes 320.

The edge gateway nodes 320 may communicate with one or more edge resource node(s) 340, which are illustratively embodied as compute servers, appliances or components located at or in a communication base station 342 (e.g., a base station of a cellular network). As discussed above, the respective edge resource node(s) 340 include an amount of processing and storage capabilities and, as such, some processing and/or storage of data for the client compute nodes 310 may be performed on the edge resource node(s) 340. For example, the processing of data that is less urgent or important may be performed by the edge resource node(s) 340, while the processing of data that is of a higher urgency or importance may be performed by the edge gateway nodes 320 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 340 also communicate with the core data center 350, which may include compute servers, appliances, and/or other components located in a central location (e.g., a central office of a cellular communication network). The example core data center 350 may provide a gateway to the global network cloud 360 (e.g., the Internet) for the edge cloud operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity).

The edge gateway nodes 320 or the edge resource node(s) 340 may offer the use of stateful applications 332 and a geographic distributed database 334. Although the applications 332 and geographic distributed database 334 are illustrated as being horizontally distributed at a layer of the edge cloud, it will be understood that resources, services, or other components of the application may be vertically distributed throughout the edge cloud (including, part of the application executed at the client compute node 310, other parts at the edge gateway nodes 320 or the edge resource node(s), etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 336 (or pod of containers) may be flexibly migrated from one of the edge gateway nodes 320 to other edge nodes (e.g., another one of the edge gateway nodes 320, one of the edge resource node(s) 340, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 340 may differ from the hardware at the edge gateway nodes 320 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format or may involve mapping interfaces and operations. A pod controller may be used to drive the interface mapping as part of the container lifecycle, which includes migration to/from different hardware environments.

The scenarios encompassed by FIG. 3 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 320, some others at the edge resource node(s) 340, and others in the core data center 350 or global network cloud 360.

Figure 4:
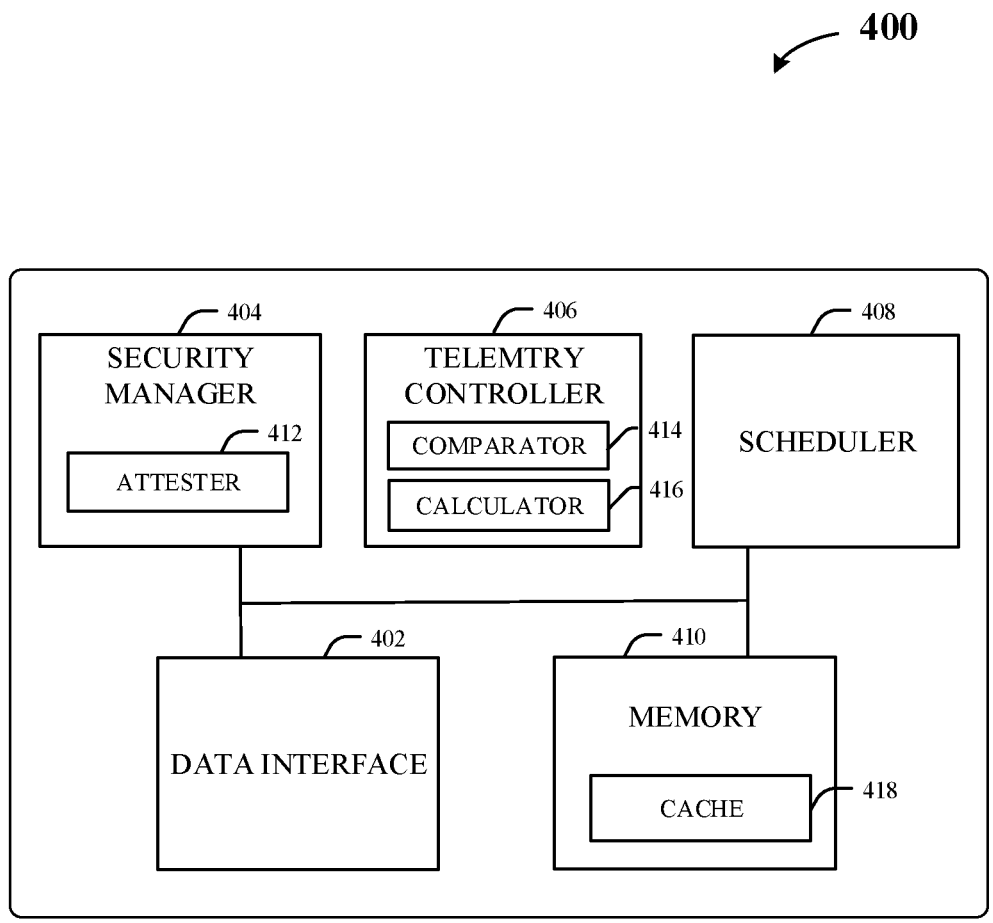
FIG. 4 is a block diagram of an example telemetry-based scheduler as disclosed herein.

In some examples, an edge node, such as the local processing hub 150 illustrated in FIG. 1 and/or the edge resource node 340 illustrated in FIG. 3 and optionally located in the edge device layer 210 illustrated in FIG. 2, includes an example telemetry-based scheduler 400 illustrated in FIG. 4. In some examples, the telemetry-based scheduler 400 receives telemetric data from a first hardware device and computes an adjustment for at least one downstream hardware device based on the telemetric data from the first hardware device. In some examples, the examples telemetry-based hardware device receives information from a second hardware device and/or any number of additional downstream hardware devices and computes and communicates one or more adjustments for the one or more downstream hardware devices based on the telemetric data from the first hardware device.

FIG. 4 is a block diagram of an example telemetry-based scheduler 400. The example telemetry-based scheduler 400 illustrated in FIG. 4 includes an example data interface 402, an example security manager 404, an example telemetry controller 406, an example scheduler 408, and an example memory 410. In the example illustrated in FIG. 4, the example security manager 404 includes an example attester 412. In the example illustrated in FIG. 4, the example telemetry controller 406 includes an example comparator 414 and an example calculator 416. In the example illustrated in FIG. 4, the example memory 410 includes an example cache 418.

In some examples, the telemetry-based scheduler 400 illustrated in FIG. 4 receives telemetric data from a first hardware device in an edge computing environment, for example, a communication base station (e.g., a base station of a cellular network), compares the telemetric data received from the first hardware device to an operating parameter, calculates a difference between the telemetric data and the operating parameter, and computes an adjustment for a second hardware device based on the calculated difference. In some examples, the telemetry-based scheduler 400 illustrated in FIG. 4 communicates the computed adjustment to the second hardware device. In some examples, the telemetry-based scheduler 400 computes an adjustment for a second hardware device and an adjustment for a third hardware device based on the calculated difference and communicates the computed adjustments to the respective hardware devices.

In some examples, the telemetry-based scheduler 400 illustrated in FIG. 4 determines, based on the comparison between the telemetric data from the first hardware device and an operating parameter, whether the first hardware device has capacity to execute a workload in accordance with the operating parameter, and, responsive to a determination that the first hardware device does not have capacity to execute the workload in accordance with the operating parameter, calculates a proposed new operating parameter based on the telemetric data of the first hardware device. In some examples, the telemetry-based scheduler 400 communicates the proposed new operating to a service provider.

In some examples, the telemetry-based scheduler 400 illustrated in FIG. 4 determines, receives, and/or otherwise accesses telemetric data from a first hardware device. In some examples, the telemetric data is a latency metric, a utilization metric, a memory bandwidth metric, a throughput metric, a power expenditure metric, and/or any other suitable metric related to the capacity and/or performance of an edge network device.

For example, the example telemetry-based scheduler 400 illustrated in FIG. 4 may determine, receive, and/or access a latency metric from a first hardware device. In some examples, the telemetry-based scheduler 400 determines a latency metric of the first hardware device by generating and sending a ping to the first hardware device and measuring the amount of time it takes for the ping to return to the example telemetry-based scheduler 400.

In some examples, the telemetry-based scheduler 400 determines, receives, and/or accesses an operating parameter. In some examples, the operating parameter is a latency parameter, a utilization parameter, a memory bandwidth parameter, a throughput parameter, a power expenditure parameter, and/or any other parameter related to the capacity and/or performance of an edge network device. In some examples, the operating parameter is determined by an agreement, e.g., a service level agreement (SLA) between a network provider and a service provider.

In some examples, the telemetry-based scheduler 400 illustrated in FIG. 4 compares a latency metric determined, received, and/or accessed from a first hardware device to a latency parameter, calculates a difference between the latency metric of the first hardware device and the latency parameter, and computes an adjustment for a second hardware device based on the calculated difference.

In some examples, responsive to the example telemetry-based scheduler 400 illustrated in FIG. 4 determining, based on the comparison between the latency metric and the latency parameter, that the first hardware device does not have capacity to execute a workload in accordance with the latency parameter, the example telemetry-based scheduler 400 calculates a proposed new latency parameter based on the latency metric of the first hardware device and transmits the proposed new operating parameter to the service level provider for the service level provider to accept, reject, and/or counter-propose a new operating parameter. In some examples, the telemetry-based scheduler negotiates and/or renegotiates the latency parameter set forth in the service level agreement with the service level provider until a latency parameter is agreed upon.

For example, responsive to the example telemetry-based scheduler 400 illustrated in FIG. 4 determining, receiving, and/or accessing a first latency metric of about 15 ms from a first hardware device and determining a latency parameter, e.g., target latency, of about 10 ms, the example telemetry-based scheduler may calculate a difference between the first latency metric and the target latency (e.g., a difference of about 5 ms in this example), and compute an adjustment for a second hardware device based on the calculated difference. For example, the example telemetry-based controller 400 may calculate a 5 ms latency decrease for the second hardware device and communicate to the second hardware device to decrease the latency of the second hardware device by about 5 ms to compensate for the latency deficiency of the first hardware device.

In some examples, the telemetry-based controller 400 may determine, based on the comparison between the first latency metric and the about target latency that the first hardware device does not have capacity to execute a workload in accordance with the target latency, e.g., the latency of the first hardware device is about 5 ms slower than the latency parameter, and, responsive to the example telemetry-based scheduler 400 determining that the first hardware device does not have capacity to execute a workload in accordance with the target latency, the example telemetry-based scheduler 400 may calculate a proposed new target latency based on the first latency metric. For example, the example telemetry-based scheduler 400 may calculate a proposed new target latency of about 15 ms based on the first latency metric of about 15 ms received from the first hardware device. The example telemetry-based scheduler 400 may then transmit the proposed new latency parameter to a service level provider for the service level provider to accept, reject, and/or counter-propose a new latency parameter. In response to the service level provider rejecting and/or counter-proposing a new latency parameter, the example telemetry-based scheduler 400 may proceed to negotiate and/or renegotiate with the service level provider until a new latency parameter is agreed to.

In some examples, the telemetry-based scheduler 400 illustrated in FIG. 4 may store, determine, receive, and/or otherwise access operating information from the second hardware device. For example, the example telemetry-based scheduler 400 scheduler may store, determine, receive, and/or access a second latency metric and/or operating information of the second hardware device. In some examples, the telemetry-based scheduler 400 receives or accesses the second latency metric and/or operating information of the second hardware device from an edge node associated with the second hardware device. Accordingly, the example telemetry-based scheduler 400 may consider the second latency metric and/or operating information of the second hardware device when computing the adjustment for the second hardware device.

In some examples, the telemetry-based scheduler 400 illustrated in FIG. 4 computes an adjustment for the second hardware device based on a first latency metric and a second latency metric and/or operating information associated with the second hardware device. For example, the example telemetry-controller 400 may receive a second latency metric of 10 ms from a second hardware device and a maximum operating latency of 8 ms from the second hardware device, i.e. the second hardware device may not operate at a faster latency than 8 ms. Thus, the second hardware device may not be able to handle a latency decrease exceeding 2 ms. The example telemetry-based scheduler 400 may consider this information when computing a latency adjustment for the second hardware device.

In some examples, the calculated difference between the first latency metric and target latency may be more than what the second hardware device can compensate for. For example, the calculated difference may be 5 ms while the second hardware device only has capacity to decrease its latency by about 2 ms. Based on this information, the example telemetry-based scheduler 400 may compute a latency decrease of about 2 ms for the second hardware device and communicate the latency decrease to the second hardware device. Thus, although the calculated latency decrease may not compensate for the entire deficit of the first hardware device, a disruption in service caused by the deficiency of the first hardware device may still be mitigated by the adjustment computed by the example telemetry-based controller 400 and communicated to the second hardware device.

In some examples, the telemetry-based scheduler 400 illustrated in FIG. 4 computes an adjustment for the second hardware device based on a percentage of the calculated difference between the first latency metric and the target latency of the first hardware device. In some examples, the telemetry-based scheduler 400 computes an adjustment of between 0% and 100% of the calculated difference (e.g., an adjustment of between 0 ms and 10 ms for a 10 ms difference). In some examples, the telemetry-based scheduler 400 computes an adjustment of between about 10% and about 100% of the calculated difference (e.g., an adjustment of between about 1 ms and about 10 ms for a 10 ms difference). In some examples, the telemetry-based scheduler 400 computes an adjustment of between about 20% and about 100% of the calculated difference (e.g., an adjustment of between about 2 ms and about 10 ms for a 10 ms difference). In some examples, the telemetry-based scheduler 400 computes an adjustment of between about 50% and about 100% of the calculated difference (e.g., an adjustment of between about 5 ms and about 10 ms for a 10 ms difference). In some examples, the telemetry-based scheduler 400 computes an adjustment of between about 90% and about 100% of the calculated difference (e.g., an adjustment of between about 9 ms and about 10 ms for a 10 ms difference). In some examples, the telemetry-based scheduler 400 computes an adjustment of about 100% of the calculated difference (e.g., an adjustment of about 10 ms for a 10 ms difference).

In some examples, the telemetry-based scheduler 400 illustrated in FIG. 4 determines, receives, and/or accesses first telemetric data from a first hardware device, second telemetric data and/or operating information from a second hardware device, and third telemetric data and/or operating information from at least a third hardware device. In some examples, the telemetry-based controller 400 computes an adjustment for at least the second hardware device and the third hardware device based on the first telemetric data from the first hardware device, the second telemetric data and/or operating information from the second hardware device, and the third telemetric data and/or operating information from the third hardware device. In some examples, the telemetry-based scheduler 400 computes an adjustment for at least the second hardware device and the third hardware device based on a calculated difference between the first telemetric data and an operating parameter of the first hardware device. In some examples, the telemetry-based scheduler 400 computes an adjustment for at least the second hardware device and the third hardware device based on a calculated difference between the first telemetric data and operating parameter of the first hardware device, the second telemetric data and/or operating information from the second hardware device, and a third telemetric data and/or operating information from the third hardware device.

In some examples, an adjustment computed by the example telemetry-based scheduler 400 illustrated in FIG. 4 for the second hardware device is different than an adjustment computed by the example telemetry-based scheduler 400 for the third hardware device. For example, the example telemetry-based scheduler 400 may compute an adjustment of about 0% of the calculated difference for the second hardware device and an adjustment of about 100% of the calculated difference for the third hardware device (e.g., a latency adjustment of about 0 ms for the second hardware device and a latency adjustment of about 10 ms for the third hardware device responsive to a latency difference of the first hardware device being about 10 ms). In some examples, the telemetry-based scheduler 400 computes an adjustment of about 10% of the calculated difference for the second hardware device and an adjustment of about 90% of the calculated difference for the third hardware device (e.g., a latency adjustment of about 1 ms for the second hardware device and a latency adjustment of about 9 ms for the third hardware device responsive to the latency difference of the first hardware device being about 10 ms). In some examples, the telemetry-based scheduler 400 computes an adjustment of about 20% of the calculated difference for the second hardware device and an adjustment of about 80% of the calculated difference for the third hardware device (e.g., a latency adjustment of about 2 ms for the second hardware device and a latency adjustment of about 8 ms for the third hardware device responsive to the latency difference of the first hardware device being about 10 ms). In some examples, the telemetry-based scheduler 400 computes an adjustment of about 30% of the calculated difference for the second hardware device and an adjustment of about 70% of the calculated difference for the third hardware device (e.g., a latency adjustment of about 3 ms for the second hardware device and a latency adjustment of about 7 ms for the third hardware device responsive to the latency difference of the first hardware device being about 10 ms). In some examples, the telemetry-based scheduler 400 computes an adjustment of about 40% of the difference for the second hardware device and an adjustment of about 60% of the difference for the third hardware device (e.g., a latency adjustment of about 4 ms for the second hardware device and a latency adjustment of about 6 ms for the third hardware device responsive to the latency difference of the first hardware device being about 10 ms).

In some examples, to avoid an adjustment of one hardware device being substantially larger than an adjustment for another hardware device, the example telemetry-based scheduler 400 illustrated in FIG. 4 computes an adjustment for the second hardware device that is about equal to an adjustment computed for the third hardware device. For example, In some examples, the telemetry-based scheduler 400 computes an adjustment of about 50% of the calculated difference for the second hardware device (e.g., a latency adjustment of about 5 ms for the second hardware device responsive to a latency difference of the first hardware device being about 10 ms) and an adjustment of about 50% of the calculated difference for the third hardware device (e.g., a latency adjustment of about 5 ms for the third hardware device responsive to a latency difference of the first hardware device being about 10 ms).

In some examples, the telemetry-based scheduler 400 of FIG. 4 determines, receives, and/or accesses first telemetric data from a first hardware device, second telemetric data and/or operating information from a second hardware device, third telemetric data and/or operating information from a third hardware device, and/or telemetric data and/or operating information from any number of additional hardware devices, compares the telemetric data of the first hardware device to an operating parameter, calculates a difference between the first telemetric data and the operating parameter, and computes an adjustment for at least the second hardware device based on the calculated difference and at least the second telemetric data and/or operating information.

In some examples, the telemetry-based controller 400 determines, based on the calculated difference between the first telemetric data and the operating parameter, whether the first hardware device has capacity to execute a workload in accordance with the operating parameter, and, responsive to a determination that the first hardware device does not have capacity to execute the workload in accordance with the operating parameter, calculates and transmits a proposed new operating parameter to a service level provider.

The example telemetry-based scheduler 400 of FIG. 4 is thus workflow-aware because the example telemetry-based scheduler 400 analyzes telemetric data from a hardware device in an edge-computing environment and maintains a workflow across one or more downstream hardware devices by adjusting the workloads of the one or more downstream hardware devise. Thus, the example telemetry-based scheduler 400 mitigates a potential breach of service level agreement and any associated disruptions in service.

In the example illustrated in FIG. 4, the example telemetry-based scheduler 400 includes an example data interface 402, an example security manager 404, an example telemetry controller 406, and an example scheduler 408. In the example illustrated in FIG. 4, the example security manager 404 includes an example attester 412 and the example telemetry controller 406 includes an example comparator 414 and an example calculator 416. In the example illustrated in FIG. 4, the example memory 410 includes an example cache 418.

In the example telemetry-based scheduler 400 illustrated in FIG. 4, the example data interface 402 receives telemetric data and/or other information from a first hardware device in an edge computing environment, for example, a communication base station (e.g., a base station of a cellular network). In some examples, the data interface 402 receives telemetric data and/or other information from at least a second hardware device. In some examples, the second hardware device is arranged downstream from the first hardware device.

In some examples, the data interface 402 receives telemetric data from a first hardware device, including a latency metric, a utilization metric, a memory bandwidth metric, a throughput metric, and/or a power expenditure metric. For example, the example data interface 402 may receive a latency metric from the first hardware device indicating the time it takes for the hardware device to process a data packet and return the data packet to a sender. Additionally or alternatively, the example data interface 402 determines the latency of the first hardware device by generating and sending a ping to the first hardware device and measuring the amount of time it takes for the ping to return to the example telemetry-based scheduler 400.

In some examples, the data interface 402 illustrated in FIG. 4 receives information from another device in the edge-computing environment, e.g., an orchestrator or an edge node associated with a second hardware device. In some examples, the data interface 402 receives information from a lower-level network layer, e.g., the edge device layer. For example, the example data interface 402 may receive information about a device at a device layer, e.g., the device layer 200 illustrated in FIG. 2. In some examples the example data interface 402 receives information from an edge-computing device positioned at a higher-level network layer in the edge-computing environment, e.g., the core network layer 230 illustrated in FIG. 2. In some examples, the data interface 402 receives information from edge-computing hardware and devices in the same layer as the example telemetry-based scheduler 400, e.g., in the edge devices layer 210 illustrated in FIG. 2.

In some examples, the data interface 402 illustrated in FIG. 4 receives one or more operating parameters from a service provider or other external source. In some examples, the operating parameter is a latency parameter, a utilization parameter, a memory bandwidth parameter, a throughput parameter, a power expenditure parameter, and/or any other parameter related to the capacity and/or performance of an edge network device. In some examples, the operating parameters are set forth in a service level agreement with a service provider.

In the example illustrated in FIG. 4, the example data interface 402 outputs data and/or other information received from an example security manager 404, an example telemetry controller 406, an example scheduler 408, and/or an example memory 410. For example, In some examples, the data interface 402 may output an indication from the example security manager 404 that data received from a device is not secure and/or did not originate from a verified source. In some examples, the data interface 402 may output a proposed new operating parameter calculated by the example telemetry controller 406 to a service provider or other external source. In some examples, the data interface 402 may output an adjustment calculated by the example scheduler 408 to at least a second hardware device.

Security decisions in an edge computing environment are complex due to the rich stakeholder ecosystem of Edge computing, where different stakeholders bring differing expertise, capabilities, and resources. For example, a stakeholder in an edge computing network may be a service provider or a network provider. A user workload may execute in an environment involving multiple stakeholders, each supplying various aspects of a deployment solution. Security decisions are linked to an understanding of which stakeholders are authorized to supply which expertise, capability, and resource. SLA's may provide context for security decisions by identifying stakeholders and contracted support.

Accesses to telemetric data, as well as the use of computational resources, should abide by well-defined protocols to ensure that such accesses and uses are not compromised in quality. For example, effectiveness of telemetry-informed optimization by an edge node may depend on the quality of the telemetry data. Malicious or accidental compromise of telemetric data quality may result in skewed or fallacious performance optimization strategies.

Knowing the quality of telemetric data means effectively knowing, (a) information about what a hardware device is,—not subject to spoofing, (b) the operations which may be performed with that hardware device, and/or (c) the required privilege or capability for performing a given operation. Such information may be obtainable by an edge node without forcing all types of information into a uniform permissions methodology (such as the user-group-other read-write-execute permissions employed in a Posix file system) or a common data format.

Attestation is the process of creating, conveying, and appraising assertions about platform trustworthiness characteristics. An edge node including an attester platform or device may prove telemetric data originated from a known hardware device (provenance attestation) or that a platform is onboarded correctly, has the correct identify, is configured correctly, is launched correctly, is owned by the right owner, complies with the right compliance criteria, e.g., an SLA, and/or is in a correct operational state (static attestation).

Attestation of telemetric data may provide a data quality metric that accompanies telemetry so that a decision to use telemetry can be made intelligently. For example, attestation data may be used to facilitate various operations that produce quality/integrity metrics of objects or services without requiring extensive coordination (costing time, bandwidths, etc.) in edge architecture.

In the example illustrated in FIG. 4, the example telemetry-based scheduler 400 includes an example security manager 404 to verify the source of telemetric data or other information received from an external source. In some examples, the security manager 404 implements a security protocol and/or mechanisms to prevent rogue attestations and/or hardware device spoofing, e.g., base station spoofing.

In the example illustrated in FIG. 4, the example security manager 404 includes an example attester 412 to verify telemetric data originated from a known hardware device (provenance attestation) or that a platform is onboarded correctly, has the correct identify, is configured correctly, is launched correctly, is owned by the right owner, complies with the right compliance criteria, e.g., an SLA, and/or is in a correct operational state (static attestation).

In some examples, the attester 412 illustrated in FIG. 4 detects base station spoofing and/or rogue attestations. Such attestation may provide benefits such as ascertaining when, where, or how data was collected and stored or verifying the software or hardware integrity of partner platforms. In some examples, the security manager 404 detects and migrates compromised or spoofed endpoints, e.g., using load balancers, and rebuilds the endpoint in a sandbox and/or a trusted execution environment such as an SGX, TDX, or a virtual machine that is securely booted. Detection of rogue base station spoofs may further include applying a variety of monitoring techniques to monitor the source of telemetric data during operation.

In some examples, the attester 412 may utilize attestation data, which may facilitate various operations that produce quality/integrity metrics of objects or services, ensure security credentials, and/or provide temporal information that provides hints regarding the quality of telemetric data over time.

In the example telemetry-based scheduler 400 illustrated in FIG. 4, the example telemetry controller 406 processes and analyzes first telemetric data from a first hardware device, calculates a difference between the first telemetric data and an operating parameter, determines, based on the calculated difference, whether the first hardware device has capacity to execute a workload, and, responsive to a determination that the first hardware device does not have capacity to execute the workload, calculates a proposed new operating parameter based on the first telemetric data from the first hardware device.

In some examples, the telemetry controller 406 illustrated in FIG. 4 determines, receives, and/or accesses first telemetric data from a first hardware device and determines, receives, and/or accesses an operating parameter from a service level provider or other external source. In some examples, the telemetry controller 406 compares the first telemetric data from the first hardware device to the operating parameter and determines whether the first hardware device has capacity to execute a workload in accordance with the operating parameter based on the comparison. In some examples, the telemetry controller 406 transmits a determination that the first hardware device does not have capacity to execute a workload in accordance with an operating parameter to the example data interface 402 for transmission to an outside source, such as the service level provider or other external source.

In some examples, responsive to a determination that the first hardware device does not have capacity to execute a workload in accordance with the operating parameter, the example telemetry controller 406 illustrated in FIG. 4 calculates a proposed new operating parameter based on the first telemetric data of the hardware device and transmits the proposed new operating parameter to a service provider or other external source. In some examples, the service provider may accept the proposed new operating parameter, reject the proposed new operating parameter, and/or counter-propose a different operating parameter. In some examples, the telemetry controller 406 receives the acceptance, rejection, and/or counter-proposal from the service provider or other external source, and, responsive to receiving a rejection and/or a counter-proposal, negotiates the operating parameter with the service provider or other external source until an agreement is reached on a new operating parameter. In some examples, responsive to reaching an agreement on a new operating parameter with the service provider or other external source, the example telemetry controller 406 updates the service level agreement with the new operating parameter.

In some examples, the telemetry controller 406 illustrated in FIG. 4 calculates a difference between first telemetric data received from a first hardware device and an operating parameter. For example, responsive to the example telemetry controller 406 determining, receiving, and/or accessing a latency metric of about 20 ms from a first hardware device and receiving and/or accessing a target latency of about 10 ms, the example telemetry controller 406 may subtract the latency parameter of 10 ms from the latency metric of about 20 ms to calculate a latency difference of about 10 ms.

In some examples, the telemetry controller 406 transmits the calculated difference to the example data interface 402 for transmission to an external source. In some examples, the telemetry controller 406 transmits the calculated difference to the example memory 410 for storage, access, and/or further processing. In some examples, the telemetry controller 406 transmits the calculated difference to the example scheduler 408 to compute an adjustment for at least a second hardware device.

In some examples, the telemetry controller 406 implements a telemetry object to permit composition of telemetry data, so that telemetry at the desired higher level of granularity may be obtained in a straight-forward way. Implementation of a telemetry object may provide for various operations by which compositions may produce metrics and provide shaping operations by which meaningful composite metrics may be defined and implemented.

In the example illustrated in FIG. 4, the example telemetry-based scheduler 400 includes an example scheduler 408. In some examples, the scheduler 408 receives first telemetric data from a first hardware device. In some examples, the first telemetric data includes a latency metric, a utilization metric, a memory bandwidth metric, a throughput metric, and/or a power expenditure metric.

In some examples, the scheduler 408 illustrated in FIG. 4 determines, receives, and/or accesses first telemetric data from a first hardware device and at least second telemetric data form a second hardware device. In some examples, the scheduler 408 receives operating information from the second hardware device.

In some examples, the scheduler illustrated in FIG. 4 receives a calculated difference between the first telemetric data and an operating parameter from the example telemetry controller 406. In some examples, the scheduler 408 computes an adjustment for the second hardware device based on the calculated difference, the second telemetric data received from the second hardware device, and/or the operating information received from the second hardware device.

In some examples, the telemetry-based scheduler 400 illustrated in FIG. 4 determines, receives, and/or accesses first telemetric data from a first hardware device, second telemetric data from a second hardware device, and at least third telemetric data from a third hardware device. In some examples, the scheduler 408 receives operating information from the second hardware device and/or the third hardware device.

In some examples, the scheduler 408 computes an adjustment for the second hardware device and/or the third hardware device based at least on the calculated difference. In some examples, the scheduler 408 computes an adjustment for the second hardware device and/or third hardware device based on the first telemetric data, the second telemetric data, and the third telemetric data. In some examples, the scheduler 408 computes an adjustment for at least the second hardware device and/or the third hardware device based on the operating information received from the second hardware device and/or third hardware device.

In some examples, an adjustment computed by the example scheduler 408 illustrated in FIG. 4 for the second hardware device is different than an adjustment computed for the third hardware device. In some examples, to avoid an adjustment of the second hardware device being substantially larger than an adjustment for the third hardware device, the example scheduler 408 computes an adjustment for the third hardware device that is about equal to the adjustment computed for the second hardware device and/or within a range above or below the computed adjustment for the second hardware device.

The example telemetry-based scheduler 400 illustrated in FIG. 4 includes an example memory 410. In some examples, the memory 410 stores information such as telemetry data from one or more hardware devices, algorithms, operating information, hardware specifications and other information, calculations, parameters, service level agreements, and/or any other information. In some examples, the memory 410 illustrated in FIG. 4 stores first telemetric data from a first hardware device, second telemetric data from a second hardware device, and/or third telemetric data from a third hardware device. In some examples, the memory 410 stores operating information from a second hardware device and/or operating information from a third hardware device. In some examples, the examples memory 410 stores one or more operating parameters for the first hardware device. In some examples, the memory 410 stores one or more service level agreements associated with the first hardware device.

In some examples, the memory 410 receives, stores, and transmits information to and from the example data interface 402, the example security manager 404, the example telemetry controller 406, and/or the example scheduler 408. In some examples, the memory 410 includes an example cache 418 to store telemetric data.

Figure 5:
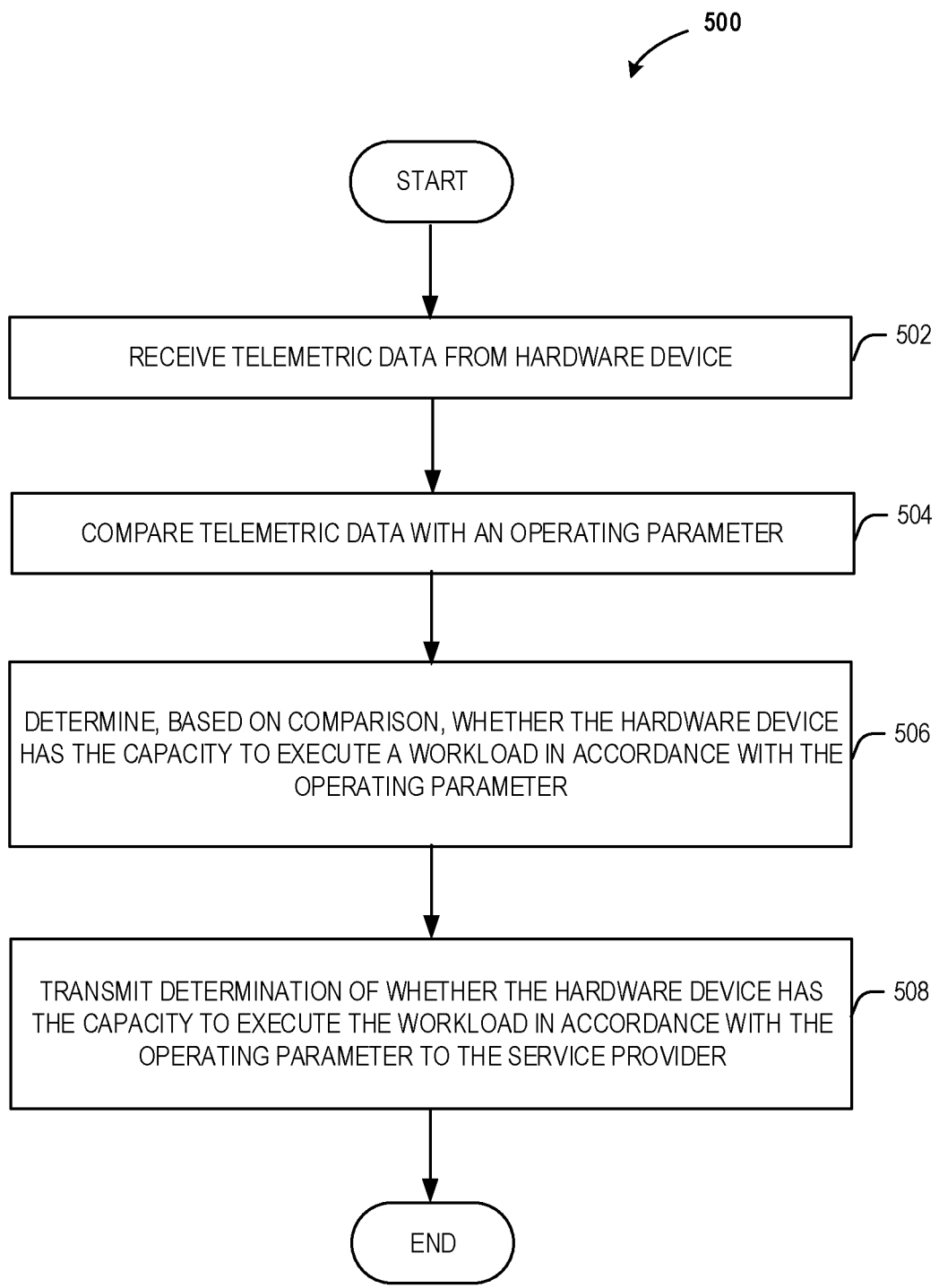
FIG. 5 is a flowchart representative of machine readable instructions which may be executed to implement an example telemetry-based scheduler.
Figure 6:
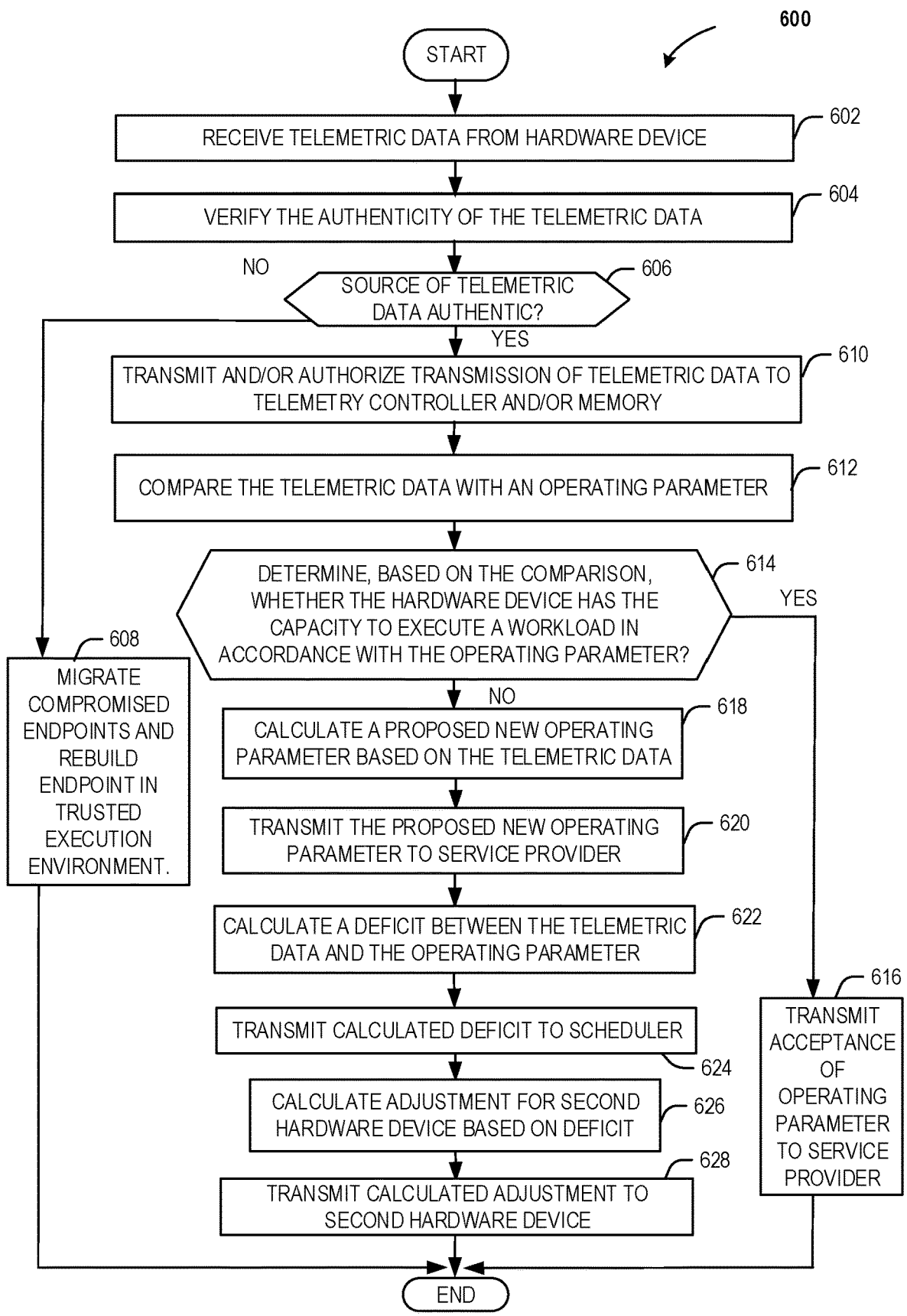
FIG. 6 is another flowchart representative of machine readable instructions which may be executed to implement an example telemetry-based scheduler.

While an example manner of implementing the secure workload scheduling methods of FIGS. 5-6 is illustrated in FIG. 4, one or more of the elements, processes and/or devices illustrated in FIG. 4 may be combined, divided, re-arranged, omitted, eliminated and/or implemented in any other way. Further, the example data interface 402, the example security manager 404, the example telemetry controller 406, the example scheduler 408, the example memory 410 and/or, more generally, the example telemetry-based scheduler of FIG. 4 may be implemented by hardware, software, firmware and/or any combination of hardware, software and/or firmware. Thus, for example, any of the example data interface 402, the example security manager 404, the example telemetry controller 406, the example scheduler 408, the example memory 410, and/or, more generally, the example telemetry-based scheduler 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 402, the example security manager 404, the example telemetry controller 406, the example scheduler 408, and/or the example memory 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example telemetry-based scheduler of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example telemetry-based scheduler 400 of FIG. 4 is shown in FIGS. 5-6. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-6, many other methods of implementing the example telemetry-based scheduler 400 illustrated in FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example machine-readable instructions 500 of FIG. 5 begin at block 502, at which the example data interface 402 illustrated in FIG. 4 receives first telemetric data, for example, a first latency metric, from a first hardware device. For example, the example data interface 402 may receive a latency metric of about 20 ms from a first hardware device.

At block 504, the example telemetry controller 406 illustrated in FIG. 4 compares a first latency metric to an operating parameter, e.g., a target latency. In some examples, the operating parameter is set forth in a service level agreement and stored in the example memory 410 illustrated in FIG. 4. For example, the example telemetry controller 406 may receive a first latency metric of about 20 ms from a first hardware device and access a target latency of about 10 ms from the example memory 410 and compare the first latency metric to the target latency.

At decision block 506, the example telemetry controller 406 illustrated in FIG. 4 determines, based on the comparison, whether the first hardware device has capacity to execute a workload in accordance with the operating parameter. For example, the example telemetry controller 406 may determine that the first hardware device does not have capacity to execute the workload in accordance with the target latency because the first latency metric of 20 ms from the first hardware device exceeds the target latency of 10 ms.

At block 508, responsive to the example telemetry controller 406 illustrated in FIG. 4 determining that the hardware device has capacity to execute the workload in accordance with the operating parameter, the example telemetry controller 406 transmits acceptance of the operating parameter to a service provider. For example, if at block 502 the example telemetry controller 406 receives a first latency metric of about 8 ms and determines that the first hardware device has capacity to execute the workload in accordance with the operating parameter at decision block 506, then the example telemetry controller 406 may transmit acceptance of the target latency to the service provider and terminate the program at block 508.

At block 510, responsive to the example telemetry controller 406 illustrated in FIG. 4 determining that the first hardware device does not have capacity to execute the workload in accordance with the operating parameter, the example telemetry controller 406 calculates a proposed new operating parameter based on the first telemetric data. For example, responsive to the example telemetry controller 406 determining that the first latency metric of about 20 ms exceeds the target latency, the example telemetry controller 406 may calculate a proposed new operating parameter of about 20 ms based on the first latency metric of 20 ms received from the first hardware device.

At block 512, the example telemetry controller 406 illustrated in FIG. 4 transmits the proposed new operating parameter to the service provider. For example, the example telemetry controller 406 may transmit to the proposed new operating parameter of about 20 ms to the service provider for the service provider to accept, reject, and/or counter-propose a new operating parameter.

The example machine-readable instructions 500 end.

The program of FIG. 6 begins at block 602, at which the example data interface 402 illustrated in FIG. 4 receives first telemetric data from a first hardware device, e.g., a first latency metric. For example, the example data interface 402 may receive a first latency metric of about 20 ms from a first hardware device.

At block 604, the example security manager 404 illustrated in FIG. 4 verifies the authenticity of the telemetric data. For example, the example security manager 404 may initiate a security protocol to verify that the first latency metric originated from the first hardware device.

At block 608, responsive to a determination that the first telemetric data does not originate from the first hardware device, the example security manager 404 illustrated in FIG. 4 migrates the compromised endpoint and rebuilds the endpoint in a trusted execution environment and the machine readable instructions are terminated. For example, the example security manager 404 may rebuild the endpoint in a sandbox, an SGX, a TDX, or a securely booted virtual machine.

At block 610, responsive to a determination that the first telemetric data originated from the first hardware device, the example security manager 404 illustrated in FIG. 4 transmits and/or authorizes transmission of the first telemetric data to the example telemetry controller 406 and/or the example memory 410 illustrated in FIG. 4. For example, the example security manager 404 may transmit or authorize the example data interface 402 to transmit the first latency metric to the example memory 410 for storage and/or to the example telemetry controller 406 for further processing.

At block 612, the example telemetry controller 406 illustrated in FIG. 4 compares the first telemetric data with an operating parameter. For example, the example telemetry controller 406 may access a target latency of about 10 ms from the example memory 410 and compare the first latency metric of about 20 ms of the first hardware device to the target latency of about 10 ms.

At decision block 614, the example telemetry controller 406 illustrated in FIG. 4 determines, based on the comparison, whether the first hardware device has capacity to execute a workload in accordance with the operating parameter. For example, the example telemetry controller 406 may determine that the first hardware device does not have capacity to execute the workload in accordance with the target latency because the first latency metric of 20 ms of the first hardware device exceeds the target latency of 10 ms.

At block 616, responsive to a determination that the hardware device has capacity to execute a workload in accordance with the operating parameter, the example telemetry controller 406 illustrated in FIG. 4 transmits acceptance of the operating parameter to a service provider. For example, if at block 602 the example telemetry controller 406 receives a first latency metric of about 8 ms and determines that the first hardware device has capacity to execute the workload in accordance with the operating parameter, then the example telemetry controller 406 transmits acceptance of the target latency to the service provider at block 616 and the machine-readable instructions end.

At block 618, responsive to a determination that the first hardware device does not have capacity to execute a workload in accordance with the operating parameter, the example telemetry controller 406 illustrated in FIG. 4 calculates a proposed new operating parameter based on the first telemetric data and transmits the proposed new operating parameter to the service provider at block 620. For example, responsive to the example telemetry controller 406 determining that the first latency metric of about 20 ms exceeds the target latency of about 10 ms, the example telemetry controller 406 may calculate a proposed new operating parameter of about 20 ms based on the first latency metric of 20 ms received from the first hardware device.

At block 622, the example telemetry controller 406 illustrated in FIG. 4 calculates a difference between the first telemetric data and the operating parameter and transmits the calculated difference to the example scheduler 408 at block 624. For example, the example telemetry controller 406 may subtract the target latency of about 10 ms from the latency metric of about 20 ms received from the hardware device to calculate a difference of about 10 ms and transmit the calculated difference of about 10 ms to the example scheduler 408. In some examples, the telemetry controller 406 may transmit an indication of whether the difference higher than the target latency, e.g., a latency deficit, or lower than the target latency.

At block 626, the example scheduler 408 illustrated in FIG. 4 computes an adjustment for a second hardware device based on the calculated difference and transmits the computed adjustment to the second hardware device at block 628. For example, the example scheduler 408 may compute an adjustment of 10 ms, e.g., 100% of the calculated difference, for the second hardware device and transmit the computed adjustment the second hardware device.

The machine-readable instructions are ended.

In further examples, any of the compute nodes or devices discussed with reference to the present edge computing systems and environment may be fulfilled based on the components depicted in FIG. 2. Respective edge nodes may be embodied as a type of device, appliance, computer, or other "thing" capable of communicating with other edge, networking, or endpoint components. For example, an edge node may be embodied as a server, a local processing hub, an edge resource node, an edge gateway node, on-premise servers, network equipment, a self-contained device having an outer case, shell, etc., or other device or system capable of performing the described functions.

Figure 7A:
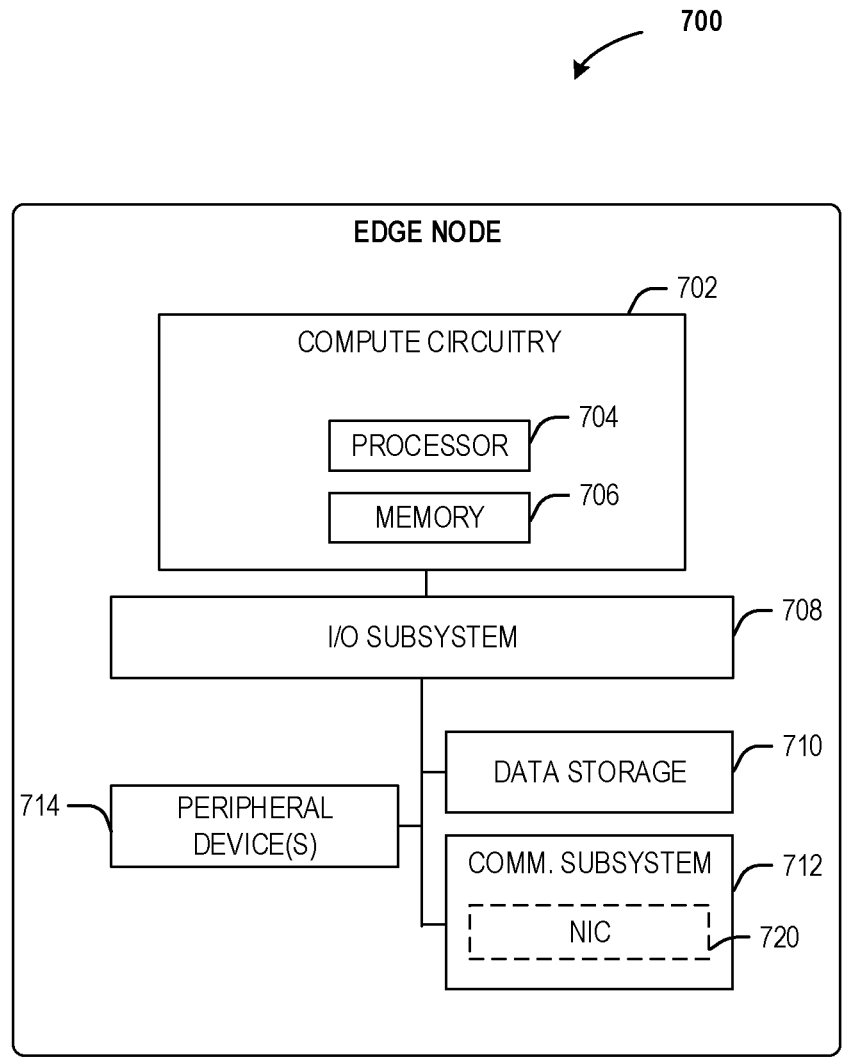
FIG. 7A is a block diagram of an example implementation of an example edge node that may be deployed in one of the edge systems illustrated in FIGS. 1-3.

FIG. 7A is a block diagram of an example implementation of an example edge node 700 that includes a compute engine (also referred to herein as "compute circuitry" 702, an input/output (I/O) subsystem 708, data storage devices 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge node 700 of FIG. 7 may be deployed in one of the edge computing systems illustrated in FIGS. 1-3 to implement any edge node of FIGS. 1-3.

The edge node 700 may be embodied as any type of engine, device, or collection of devices capable of performing various compute functions. In some examples, the edge node 700 may be embodied as a single device such as an integrated circuit, an embedded system, a field-programmable gate array (FPGA), a system-on-a-chip (SOC), or other integrated system or device. In the illustrative example, the edge node 700 includes or is embodied as a processor 704 and a main memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the edge node 700.

The main memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 706 may be integrated into the processor 704. The main memory 706 may store various software and data used during operation such as one or more applications, data operated on by the application(s), libraries, and drivers.

The compute circuitry 702 is communicatively coupled to other components of the edge node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the main memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage devices 710. Individual data storage devices 710 may also include one or more operating system partitions that store data files and executables for operating systems depending on, for example, the type of edge node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node to connect with another compute device (e.g., an edge gateway node). In some examples, the NIC 720 may be embodied as part of a system-on-a-chip (SoC) that includes one or more processors or included on a multichip package that also contains one or more processors. In some examples, the MC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective edge node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the edge node 700. In further examples, the edge node 700 may be embodied by a respective edge node (whether a client, gateway, or aggregation node) in an edge computing system or like forms of appliances, computers, subsystems, circuitry, or other components.

Figure 7B:
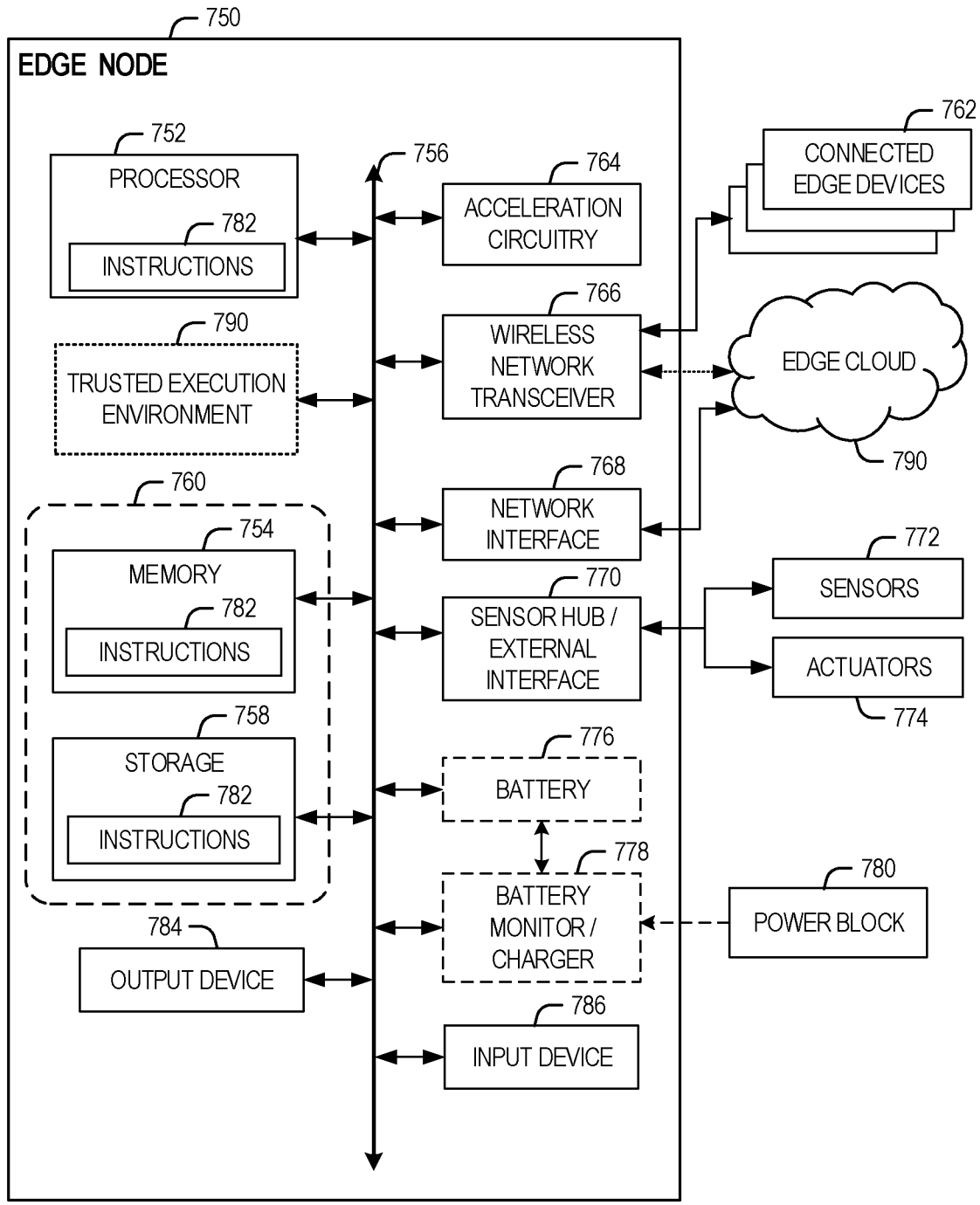
FIG. 7B is another block diagram of an example implementation of an example edge node that may be deployed in one of the edge computing systems illustrated in FIGS. 1-3.

In a more detailed example, FIG. 7B illustrates a block diagram of an example of an edge node 750 structured to execute the instructions of FIGS. 5-6 to implement the techniques (e.g., operations, processes, methods, and methodologies) described herein such as the example telemetry-based scheduler 400 of FIG. 4. This edge node 750 provides a closer view of the respective components of edge node 700 when implemented as or as part of a computing device (e.g., as a mobile device, a base station, server, gateway, etc.). The edge node 750 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge node 750, or as components otherwise incorporated within a chassis of a larger system. For example, the edge node 750 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B. In this example, the processor implements the example data interface 402, the example security manager 404, the example telemetry controller 406, the example scheduler 408, and the example memory 410 illustrated in FIG. 4.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an I2C interface, an SPI interface, point to point interfaces, and a power bus, among others.

The interconnect 756 may couple the processor 752 to a wireless network transceiver 766, for communications with the connected edge devices 762. The wireless network transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge node 750 may communicate with close devices, e.g., within about 10 meters, using a local transceiver based on BLE, or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 790 via local or wide area network protocols. The wireless network transceiver 766 may be an LPWA transceiver that follows the IEEE 802.15.4, or IEEE 802.15.4g standards, among others. The edge node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the wireless network transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The wireless network transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 790 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge node 750 may include or be coupled to acceleration circuitry 764, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or external interface 770 further may be used to connect the edge node 750 to actuators 774, such as power switches, valve actuators, an audible sound generator, a visual warning device, and the like.

In some optional examples, various input/output (I/O) devices may be present within or connected to, the edge node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge node 750, although, in examples in which the edge node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include computer readable instructions 782 in the form of software, firmware, or hardware commands to implement the techniques described herein. Although such computer readable instructions 782 are shown as code blocks included in the memory 754 and the storage 758, it may be understood that any of the code blocks may be replaced with hardwired circuits, for example, built into an application specific integrated circuit (ASIC).

In an example, the computer readable instructions 782 provided via the memory 754, the storage 758, or the processor 752 may be embodied as a non-transitory, machine-readable medium 760 including code to direct the processor 752 to perform electronic operations in the edge node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
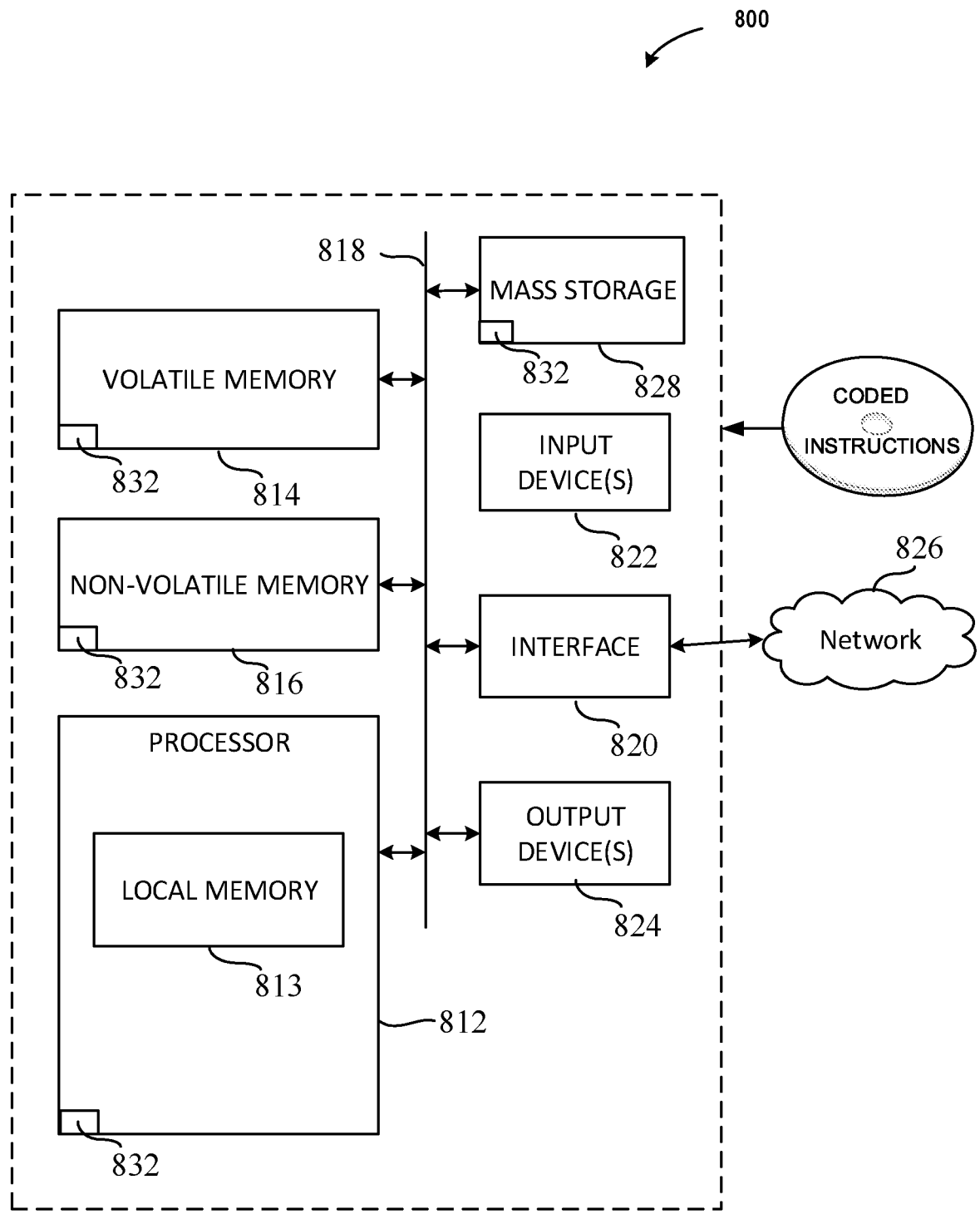
FIG. 8 is a block diagram of an example processing platform structured to execute the instructions of FIGS. 5-6 to implement an example telemetry-based scheduler.

FIG. 8 is a block diagram of an example processor platform 800 structured to execute the instructions of FIGS. 5-6 to implement the example telemetry-based scheduler 400 of FIG. 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 402, the example security manager 404, the example telemetry controller 406, the example scheduler 408, and the example memory 410 illustrated in FIG. 4.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5-6 may be stored in the mass storage device 828, in the volatile memory 814, in the non-volatile memory 816, and/or on a removable non-transitory computer readable storage medium such as a CD or DVD.

Figure 9:
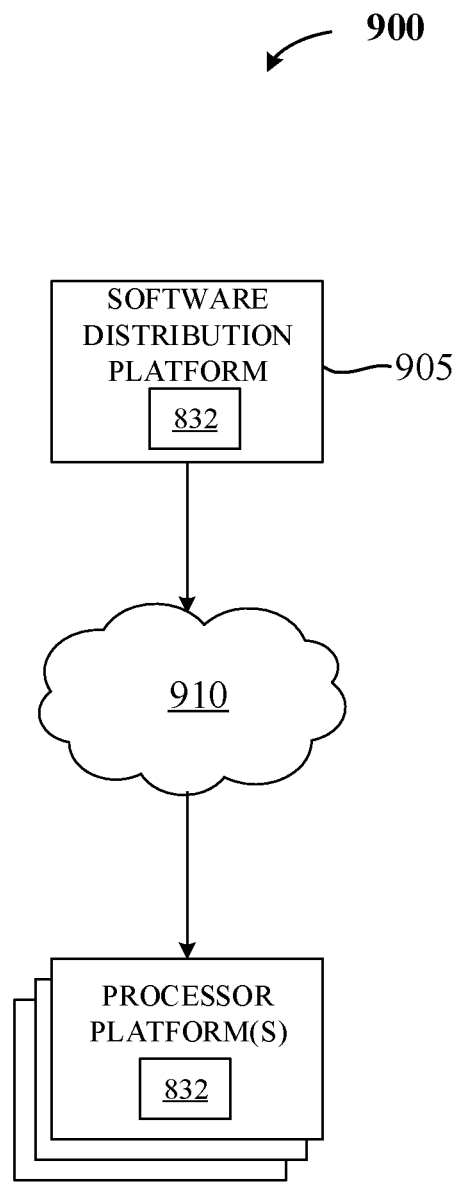
FIG. 9 is a block diagram of an example software distribution platform to distribute software (e.g., software corresponding to the example computer readable instructions of FIGS. 5-6) service providers and network providers (e.g., for sale, re-sale, license, and/or sub-license) and/or original equipment manufacturers (OEMs) (e.g., for inclusion in products to be distributed to, for example, service providers and/or network providers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 832 of FIG. 8, as described above. The one or more servers of the example software distribution platform 905 are in communication with a network 910, which may correspond to any one or more of the Internet and/or any of the example networks 910 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 832 of FIG. 8, may be downloaded to the example processor platform 800, which is to execute the computer readable instructions 832 to implement the methods for secure workload scheduling. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example systems methods, apparatus and articles of manufacture have been disclosed that are workflow-aware and schedule workloads based on secure edge to device telemetry. The disclosed systems, methods, apparatus and articles of manufacture improve the efficiency of using a computing device by collecting and analyzing telemetric data to identify and remediate problems, stressors, and/or performance deficiencies, compute adjustments and prioritize the right resources in the proper proportions to compensate for the problems, stressors, and/or performance deficiencies. The The disclosed methods, apparatus and articles of manufacture are accordingly directed to one or more improvement (s) in the functioning of a computer.

Example methods, apparatus, systems, and articles of manufacture to schedule workloads based on secure edge to device telemetry are disclosed herein. Further examples and combinations thereof include the following:

Example 1 includes an edge node, comprising a telemetry controller to calculate a difference between a first telemetric data received from a first hardware device and an operating parameter, and a scheduler to compute an adjustment for a second hardware device based on the difference between the first telemetric data and the operating parameter.

Example 2 includes the edge node of example 1, wherein the telemetry controller is to determine, based on a comparison between the first telemetric data and the operating parameter, whether the first hardware device has capacity to execute a workload in accordance with the operating parameter, and, responsive to a determination that the first hardware device does not have capacity to execute the workload in accordance with the operating parameter, calculate a proposed new operating parameter.

Example 3 includes the edge node of example 1, wherein the first hardware device is a base station.

Example 4 includes the edge node of example 1, wherein the first telemetric data includes at least one of a latency metric, a utilization metric, a memory bandwidth metric, a throughput metric, and a power expenditure metric.

Example 5 includes the edge node of example 1, wherein the operating parameter includes at least one of a latency parameter, a utilization parameter, a memory bandwidth parameter, a throughput parameter, and a power expenditure parameter.

Example 6 includes the edge node of example 1, wherein the operating parameter is set forth in a service level agreement.

Example 7 includes the edge node of example 1, including a security manager to verify a source of the first telemetric data.

Example 8 includes the edge node of example 7, wherein the security manager includes an attester to detect a rogue attestation.

Example 9 includes the edge node of example 1, wherein the scheduler computes an adjustment for a third hardware device based on the calculated difference between the first telemetric data and the operating parameter.

Example 10 includes the edge node of example 9, wherein the adjustment for the second hardware device is about equal to the adjustment of the third hardware device.

Example 11 includes a non-transitory computer readable medium comprising computer readable instructions that, when executed, cause at least one processor to at least calculate a difference between a first telemetric data received from a first hardware device and an operating parameter, and compute an adjustment for a second hardware device based on the difference between the first telemetric data and the operating parameter.

Example 12 includes the non-transitory computer readable medium of example 11, wherein the computer readable instructions are further to cause the at least one processor to at least determine, based on a comparison between the first telemetric data and the operating parameter, whether the first hardware device has capacity to execute a workload in accordance with the operating parameter, and, responsive to a determination that the first hardware device does not have capacity to execute the workload in accordance with the operating parameter, calculate a proposed new operating parameter.

Example 13 includes the non-transitory computer readable medium of example 11, wherein the first hardware device is a base station.

Example 14 includes the non-transitory computer readable medium of example 11, wherein the first telemetric data includes at least one of a latency metric, a utilization metric, a memory bandwidth metric, a throughput metric, and a power expenditure metric.

Example 15 includes the non-transitory computer readable medium of example 11, wherein the operating parameter includes at least one of a latency parameter, a utilization parameter, a memory bandwidth parameter, a throughput parameter, and a power expenditure parameter.

Example 16 includes the non-transitory computer readable medium of example 11, wherein the operating parameter is set forth in a service level agreement.

Example 17 includes the non-transitory computer readable medium of example 11, wherein the computer readable instructions are further to cause the at least one processor to at least verify a source of the first telemetric data.

Example 18 includes the non-transitory computer readable medium of example 11, wherein the computer readable instructions are further to cause the at least one processor to at least detect a rogue attestation.

Example 19 includes the non-transitory computer readable medium of example 11, wherein the computer readable instructions are further to cause the at least one processor to at least compute an adjustment for a third hardware device based on the calculated difference between the first telemetric data and the operating parameter.

Example 20 includes the non-transitory computer readable medium of example 19, wherein the adjustment for the second hardware device is about equal to the adjustment of the third hardware device.

Example 21 includes an edge node, comprising means for calculating a difference between a first telemetric data received from a first hardware device and an operating parameter, and means for computing an adjustment for a second hardware device based on the difference between the first telemetric data and the operating parameter.

Example 22 includes the edge node of example 21, including means for determining, based on a comparison between the first telemetric data and the operating parameter, whether the first hardware device has capacity to execute a workload in accordance with the operating parameter, and, responsive to a determination that the first hardware device does not have capacity to execute the workload in accordance with the operating parameter, calculating a proposed new operating parameter.

Example 23 includes the edge node of example 21, wherein the first hardware device is a base station.

Example 24 includes the edge node of example 21, wherein the first telemetric data includes at least one of a latency metric, a utilization metric, a memory bandwidth metric, a throughput metric, and a power expenditure metric.

Example 25 includes the edge node of example 21, wherein the operating parameter includes at least one of a latency parameter, a utilization parameter, a memory bandwidth parameter, a throughput parameter, and a power expenditure parameter.

Example 26 includes the edge node of example 21, wherein the operating parameter is set forth in a service level agreement.

Example 27 includes the edge node of example 21, including a means for verifying a source of the first telemetric data.

Example 28 includes the edge node of example 21, including means for detecting a rogue attestation.

Example 29 includes the edge node of example 21, including means for computing an adjustment for a third hardware device based on the calculated difference between the first telemetric data and the operating parameter.

Example 30 includes the edge node of example 29, wherein the adjustment for the second hardware device is about equal to the adjustment of the third hardware device.

Example 31 includes a method, comprising calculating a difference between a first telemetric data received from a first hardware device and an operating parameter, and computing an adjustment for a second hardware device based on the difference between the first telemetric data and the operating parameter.

Example 32 includes the method of example 31, including determining, based on a comparison between the first telemetric data and the operating parameter, whether the first hardware device has capacity to execute a workload in accordance with the operating parameter, and, responsive to a determination that the first hardware device does not have capacity to execute the workload in accordance with the operating parameter, calculating a proposed new operating parameter.

Example 33 includes the method of example 31, wherein the first hardware device is a base station.

Example 34 includes the method of example 31, wherein the first telemetric data includes at least one of a latency metric, a utilization metric, a memory bandwidth metric, a throughput metric, and a power expenditure metric.

Example 35 includes the method of example 31, wherein the operating parameter includes at least one of a latency parameter, a utilization parameter, a memory bandwidth parameter, a throughput parameter, and a power expenditure parameter.

Example 36 includes the method of example 31, wherein the operating parameter is set forth in a service level agreement.

Example 37 includes the method of example 31, including verifying a source of the first telemetric data.

Example 38 includes the method of example 31, including detecting a rogue attestation.

Example 39 includes the method of example 31, including computing an adjustment for a third hardware device based on the calculated difference between the first telemetric data and the operating parameter.

Example 40 includes the method of example 39, wherein the adjustment for the second hardware device is about equal to the adjustment of the third hardware device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An edge node, comprising:
    a telemetry controller to;
        determine, based on a first telemetric data received from a first hardware device and a first operating parameter, whether the first hardware device has capacity to execute a workload in accordance with the first operating parameter; and
        determine a second operating parameter based on the capacity of the first hardware device to execute the workload; and
    a scheduler to compute an adjustment for a second hardware device based on the first telemetric data and the second operating parameter.

2. The edge node of claim 1, wherein the second operating parameter is a proposed new operating parameter.

3. The edge node of claim 1, wherein the first hardware device is a base station.

4. The edge node of claim 1, wherein the first telemetric data includes at least one of a latency metric, a utilization metric, a memory bandwidth metric, a throughput metric, and a power expenditure metric.

5. The edge node of claim 1, wherein the first operating parameter includes at least one of a latency parameter, a utilization parameter, a memory bandwidth parameter, a throughput parameter, and a power expenditure parameter.

6. The edge node of claim 1, wherein the first operating parameter is set forth in a service level agreement.

7. The edge node of claim 1, including a security manager to verify a source of the first telemetric data.

8. The edge node of claim 7, wherein the security manager includes an attester to detect a rogue attestation.

9. The edge node of claim 1, wherein the scheduler computes an adjustment for a third hardware device based on the first telemetric data and the first operating parameter.

10. The edge node of claim 9, wherein the adjustment for the second hardware device is about equal to the adjustment of the third hardware device.

11. A non-transitory computer readable medium comprising computer readable instructions that, when executed, cause at least one processor to at least:
    determine, based on a first telemetric data received from a first hardware device and a first operating parameter, whether the first hardware device has capacity to execute a workload in accordance with the first operating parameter;
    determine a second operating parameter based on the capacity of the first hardware device to execute the workload; and
    compute an adjustment for a second hardware device based on the first telemetric data and the second operating parameter.

12. The non-transitory computer readable medium of claim 11, wherein the second operating parameter is a proposed new operating parameter.

13. The non-transitory computer readable medium of claim 11, wherein the computer readable instructions are further to cause the at least one processor to at least verify a source of the first telemetric data.

14. The non-transitory computer readable medium of claim 11, wherein the computer readable instructions are further to cause the at least one processor to at least detect a rogue attestation.

15. The non-transitory computer readable medium of claim 11, wherein the computer readable instructions are further to cause the at least one processor to at least compute an adjustment for a third hardware device based on the first telemetric data and the first operating parameter.

16. An edge node, comprising:
means for determining to:
determine, based on a first telemetric data and a first operating parameter, whether a first hardware device has capacity to execute a workload in accordance with the first operating parameter; and
determine a second operating parameter based on the capacity of the first hardware device to execute the workload; and
means for computing an adjustment for a second hardware device based on the first telemetric data and the second operating parameter.

17. The edge node of claim 16, wherein the second operating parameter is a proposed new operating parameter.

18. The edge node of claim 16, including a means for verifying a source of the first telemetric data.

19. The edge node of claim 16, including means for detecting a rogue attestation.

20. The edge node of claim 16, wherein the means for computing is to compute an adjustment for a third hardware device based on the first telemetric data and the first operating parameter.

21. A method, comprising:
determining, based on a first telemetric data received from a first hardware device and a first operating parameter, whether the first hardware device has capacity to execute a workload in accordance with the first operating parameter;
determining a second operating parameter based on the capacity of the first hardware device to execute the workload; and
computing an adjustment for a second hardware device based on the first telemetric data and the second operating parameter.

22. The method of claim 21, wherein the second operating parameter is a proposed new operating parameter.

23. The method of claim 21, including verifying a source of the first telemetric data.

24. The method of claim 21, including detecting a rogue attestation.

25. The method of claim 21, including computing an adjustment for a third hardware device based on the first telemetric data and the first operating parameter.

* * * * *

UNITED STATES PATENT AND TRADEMARK OFFICE
CERTIFICATE OF CORRECTION

| | |
|---|---|
| PATENT NO. | : 12,068,928 B2 |
| APPLICATION NO. | : 17/033557 |
| DATED | : August 20, 2024 |
| INVENTOR(S) | : Sood et al. |

It is certified that error appears in the above-identified patent and that said Letters Patent is hereby corrected as shown below:

In the Drawings

Figure 4, Field 406, Delete "TELEMTRY" and insert --TELEMETRY--.

Signed and Sealed this
Nineteenth Day of November, 2024

Katherine Kelly Vidal
*Director of the United States Patent and Trademark Office*